(12) United States Patent
Nakamura et al.

(10) Patent No.: US 7,127,215 B2
(45) Date of Patent: *Oct. 24, 2006

(54) TRANSMITTING/RECEIVING SWITCH

(75) Inventors: Hiroyuki Nakamura, Katano (JP);
   Makoto Sakakura, Uji (JP); Toshio Ishizaki, Kobe (JP); Jyunichi Yoshizumi, Nara (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 795 days.

(21) Appl. No.: 09/425,668

(22) Filed: Oct. 22, 1999

(65) Prior Publication Data

US 2003/0119455 A1 Jun. 26, 2003

(30) Foreign Application Priority Data

Oct. 22, 1998 (JP) .......................... 10-301128

(51) Int. Cl.
   *H04B 1/44* (2006.01)
   *H01P 5/12* (2006.01)

(52) U.S. Cl. ............................. 455/78; 333/101; 455/83
(58) Field of Classification Search ................ 455/501, 455/42, 63, 78, 81, 82, 83, 121, 87; 333/103, 333/104, 101
   See application file for complete search history.

(56) References Cited

U.S. PATENT DOCUMENTS

| | | | |
|---|---|---|---|
| 4,677,688 A | | 6/1987 | Yoshihara et al. |
| 5,023,935 A | | 6/1991 | Vancraeynest |
| 5,193,218 A | * | 3/1993 | Shimo .................. 333/103 |
| 5,507,011 A | | 4/1996 | Chigodo et al. |
| 5,604,470 A | | 2/1997 | Atokawa |
| 5,634,200 A | | 5/1997 | Kitakubo et al. |
| 5,822,684 A | * | 10/1998 | Kitakubo .............. 333/103 |
| 5,896,563 A | * | 4/1999 | Kawanami et al. ....... 333/1.1 |
| 6,034,990 A | * | 3/2000 | Kang .................. 332/100 |
| 6,108,313 A | * | 8/2000 | Lee et al. ............. 333/1.1 |
| 6,289,204 B1 | * | 9/2001 | Estes et al. ........... 333/103 |

FOREIGN PATENT DOCUMENTS

| | | |
|---|---|---|
| EP | 0 667 684 | 8/1995 |
| JP | 60-111149 | 7/1985 |
| JP | 4-35324 | 2/1992 |
| JP | 8-237166 | 9/1996 |

OTHER PUBLICATIONS

Offical Action from the UK Patent Office corresponding to application No. GB 9925071.4 Dated Nov. 26, 2002.
British Search Report, application No. 9925071.4, dated May 3, 2000.
JPO Office Action issued on Aug. 5, 2003 (partial translation provided).

* cited by examiner

*Primary Examiner*—Edward F. Urban
*Assistant Examiner*—S. Smith
(74) *Attorney, Agent, or Firm*—RatnerPrestia

(57) ABSTRACT

A transmitting/receiving switch, in which a transmission terminal connected to a transmission circuit is connected to an antenna terminal through a first switching element, a filter for attenuating harmonic contents in a transmission signal, a phase-shift circuit for significantly increasing an impedance from a node toward said transmission terminal in a reception frequency band by phase-adjusting the amount of phase shift by performing phase adjustment according to the amount of the phase shift generated by said filter. Furthermore, the antenna terminal connected to an antenna ANT is connected to a reception terminal through the node and a second switching element, and the reception terminal is connected to a reception circuit Rx.

11 Claims, 5 Drawing Sheets

TRANSMITTING/RECEIVING SWITCH

BACKGROUND OF THE INVENTION

1. Field of the Invention

This invention relates to a transmitting/receiving switch and a portable terminal unit that are used to switch high-frequency signal transmission lines such as a high-frequency circuit in a radio transceiver or a portable terminal unit.

2. Description of the Related Art

Referring to FIG. 5, there is a block diagram of one example of a conventional transmitting/receiving switch. The shown example includes an antenna terminal 501 connected to an antenna ANT, a transmission terminal 502 connected to a transmission circuit Tx, a reception terminal 503 connected to a reception circuit Rx and a control terminal 504 connected to a control circuit CONT that performs transfer switching controls. The transmission terminal 502 is connected to the anode of a first diode 506 through a first capacitor 505. The cathode of the first diode 506 is connected to the antenna terminal 501 through a node 507 and a second capacitor 508. The antenna terminal 501 is also connected to the reception terminal 503 through a second capacitor 508, a node 507, a quarter-wave line 509 and a third capacitor 510. Furthermore, the anode of the first diode 506 is also connected to the control terminal 504 through a coil 511 and a resistance 512. A midpoint between the coil 511 and the resistance 512 is grounded through a fourth capacitor 513. The anode of a second diode 514 is connected to the midpoint between the quarter-wave line 509 and the third capacitor 510, and the cathode of said second diode 514 is grounded.

Referring to the transmitting/receiving switch shown in FIG. 5, in case of connecting the transmission circuit Tx with the antenna ANT, a positive voltage is supplied from the control circuit CONT to the control terminal 504 that turns on the first diode 506 and the second diode 514. At this time, the direct-current component of the positive voltage supplied from the control terminal 504 is blocked by the first through fourth capacitors 505, 508, 510 and 513, and thus the positive voltage is applied to only the partial circuit that includes the first diode 506 and the second diode 514. Said positive voltage drives the first diode 506 and the second diode 514 to the ON state. In this case, the ON state of the first diode 506 lowers the impedance between the transmission terminal 502 and the antenna terminal 501 to establish a connection between them. Meanwhile, the ON state of the second diode 514 brings the quarter-wave line 509 grounded at high frequencies and makes the impedance from the node 507 toward the reception terminal 503 significantly high. As a consequence, an input signal from the transmission terminal 502 is transmitted to the antenna terminal 501 without leaking into the reception terminal 503.

Also referring to the transmitting/receiving switch shown in FIG. 5, in case of connecting the reception circuit Rx and the antenna ANT, a null voltage is supplied from the control circuit CONT to the control terminal 504. Under this condition, the first and second diodes 506 and 514 are driven to the OFF state and the impedance from the node 507 toward the transmission terminal 502 becomes significantly high. The reception terminal 503 and the antenna terminal 501 are connected through the node 507, quarter-wave line 509 and the third capacitor 510. As a consequence, input signals from the antenna terminal 50.1 are transmitted to the reception terminal 503 without leaking into the transmission terminal 502.

As described above, the conventional transmitting/receiving switch performs reception/transmission switching by supplying a positive voltage or null voltage to the first and second diodes 506 and 514. The conventional art transmitting/receiving switch suffers from a problem when high-power transmission signal is imposed on the transmission terminal 502: the transmission signal is distorted due to the non-linearity of the switching element of the first diode 506; harmonic contents are produced in the transmission signal; said harmonic contents are transmitted to the antenna terminal 501 and radiated from the antenna ANT.

BRIEF SUMMARY OF THE INVENTION

One aspect of the present invention is a transmitting/receiving switch that solves above described problem. A transmitting/receiving switch according to the present invention attenuates harmonic contents in the transmission signal produced by the distortion of the transmission signal due to the non-linearity of the switching element, without increasing the reception loss. Another aspect of the present invention is a portable terminal unit having a transmitting/receiving switch of the present invention.

One aspect of the present invention is a transmitting/receiving switch comprising:
   an antenna terminal connected to an antenna;
   a transmission terminal connected to a transmission circuit;
   a reception terminal connected to a reception circuit;
   a first switching element that turns on or off the connection between said antenna terminal and said transmission terminal;
   a second switching element that turns on or off the connection between said antenna terminal and said reception terminal; and
   filtering means inserted between said first switching element and said antenna terminal,
      wherein said filtering means (1) attenuates harmonic contents in the transmission signal and (2) has phase characteristics that increases the impedance from the node between said antenna terminal and said second switching element toward said transmission terminal in the reception frequency band.

Another aspect of the present invention is the transmitting/receiving switch, wherein said filtering means comprises:
   a filter that attenuates harmonic contents in said transmission signal; and
   a phase-shift circuit that performs phase adjustment on the basis of said phase characteristics according to the amount of phase shift caused by said filter.

Still another aspect of the present invention is the an transmitting/receiving switch, wherein said first switching element comprises a diode and said second switching element comprises a diode and a quarter-wave line.

Yet another aspect of the present invention is the transmitting/receiving switch, wherein said filter comprises a low pass filter that attenuates the harmonic contents in the transmission signal.

Still yet another aspect of the present invention is the fitransmitting/receiving switch, wherein said phase-shift circuit comprises either (1) a strip line or (2) a lumped constant circuit having a coil and/or capacitor.

A further aspect of the present invention is a portable terminal unit comprising:
   an antenna for radio transmission and radio reception;

a transmitting/receiving switch as recited in said the first invention that switches transmission lines through which signals flow during said radio transmission or radio reception;

a transmission circuit connected to said transmission terminal of said transmitting/receiving switch; and a reception circuit connected to said reception terminal of said transmitting/receiving switch.

DESCRIPTION OF SYMBOLS

Figure 1:
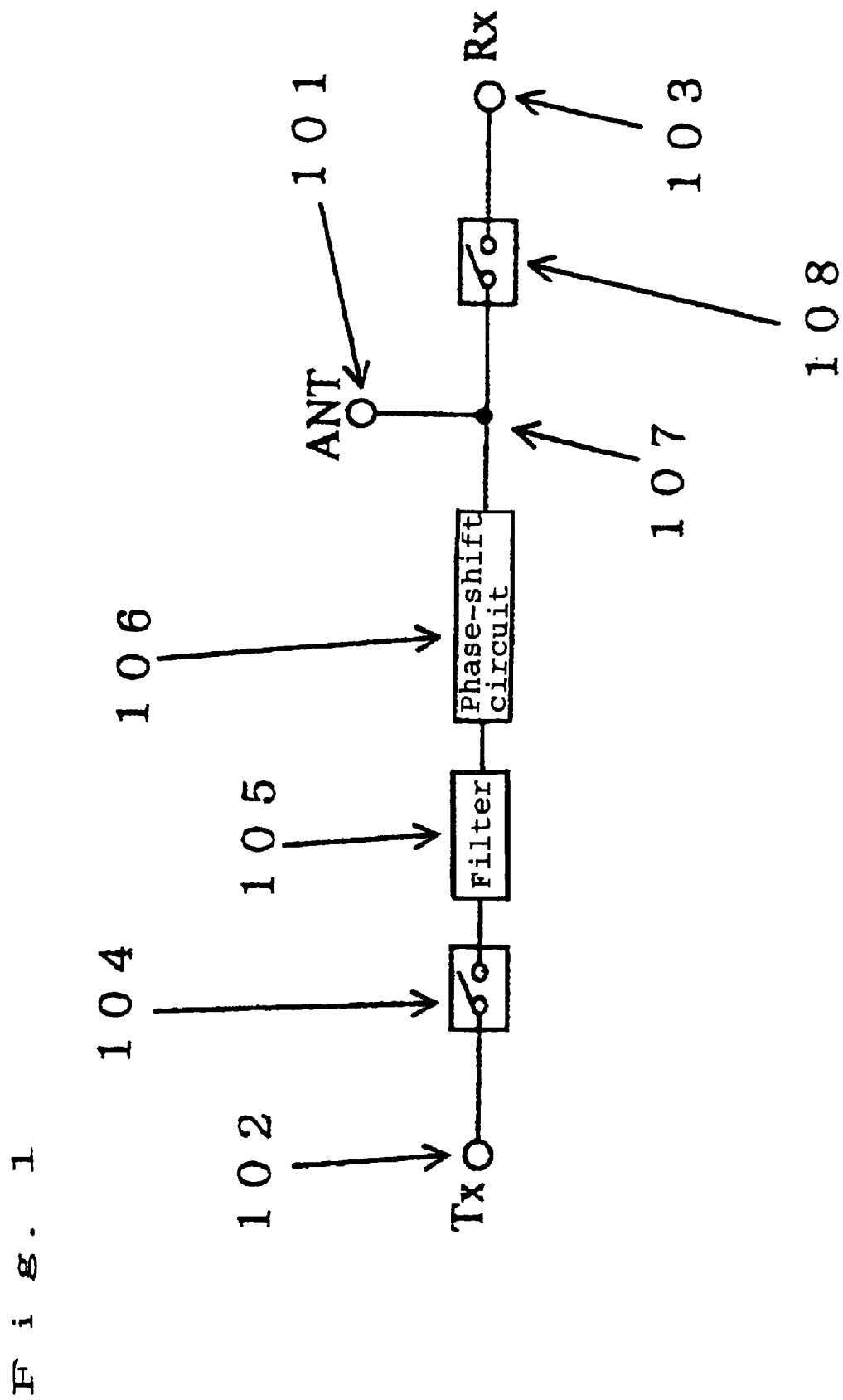
FIG. 1 is a block diagram of a first embodiment of the transmitting/receiving switch according to the present invention.

| | |
|---|---|
| 101, 201, 501 | Antenna terminal |
| 102, 202, 502 | Transmission terminal |
| 103, 203, 503 | Reception terminal |
| 104 | First switching element |
| 105 | Filter |
| 106, 208 | Phase-shift circuit |
| 107, 209, 507 | Node |
| 108 | Second switching element |
| 204, 504 | Control terminal |
| 205, 505 | First capacitor |
| 206, 506 | First diode |
| 207 | Low pass filter |
| 210, 508 | Second capacitor |
| 211, 509 | Quarter-wave line |
| 212, 510 | Third capacitor |
| 213, 511 | Coil |
| 214, 512 | Resistance |
| 215, 513 | Forth capacitor |
| 216, 514 | Second diode |

DETAILED DESCRIPTION OF THE PREFERRED EMBODIMENTS

Preferred embodiments of the transmitting/receiving switch according to the present invention will now be described referring to the drawings.

First Embodiment

FIG. 1 shows a block diagram of a first embodiment of the transmitting/receiving switch according to the present invention.

The first embodiment of the transmitting/receiving switch according to the present invention comprises an antenna terminal 101 connected to an antenna ANT, a transmission terminal 102 connected to a transmission circuit Tx and a reception terminal 103 connected to a reception circuit Rx.

The transmission terminal 102 is also connected to the antenna terminal 101 through a first switching element 104, a filter 105 that passes transmission signals, a phase-shift circuit 106 and a node 107.

The antenna terminal 101 is also connected to the reception terminal 103 through the node 107 and a second switching element 108. In this configuration, a filter 105 and a phase-shift circuit 106 configure a filtering means.

Operation of the transmitting/receiving switch configured as above will be described below.

In case of connecting the transmission circuit Tx with the antenna ANT; the first switching element 104 is turned on and the second switching element 108 is turned off.

Under this condition, when the transmission signal is fed through the transmission terminal 102 the impedance from the node 107 toward the reception terminal 103 in the transmission frequency band is significantly high because the second switching element 108 is in the OFF state. Therefore, the transmission signal fed through the transmission terminal 102 is transmitted to the antenna terminal 101 through the first switching element 104, the filter 105, the phase-shift circuit 106 and the node 107 without leaking into the reception terminal 103.

In this case, the filter 105 attenuates harmonic contents in the transmission signal produced by the distortion of the transmission signal due to the non-linearity of the switching element of the first switching element 104.

In case of connecting the antenna ANT with the reception circuit Rx, the first switching element 104 is turned off and the second switching element 108 is turned on.

Under this condition, when the reception signal is fed through the antenna terminal 101 the first switching element 104 is in the OFF state and the impedance from the node 107 toward the transmission terminal 102 in the reception frequency band significantly increases by adjusting the phase using the phase-shift circuit 106 according to the amount of phase shift in the filter 105. Therefore, a reception signal fed through the antenna terminal 101 is transmitted to the reception terminal 103 through the node 107 and second switching element 108 without leaking into the transmission terminal 102.

Second Embodiment

Figure 2:
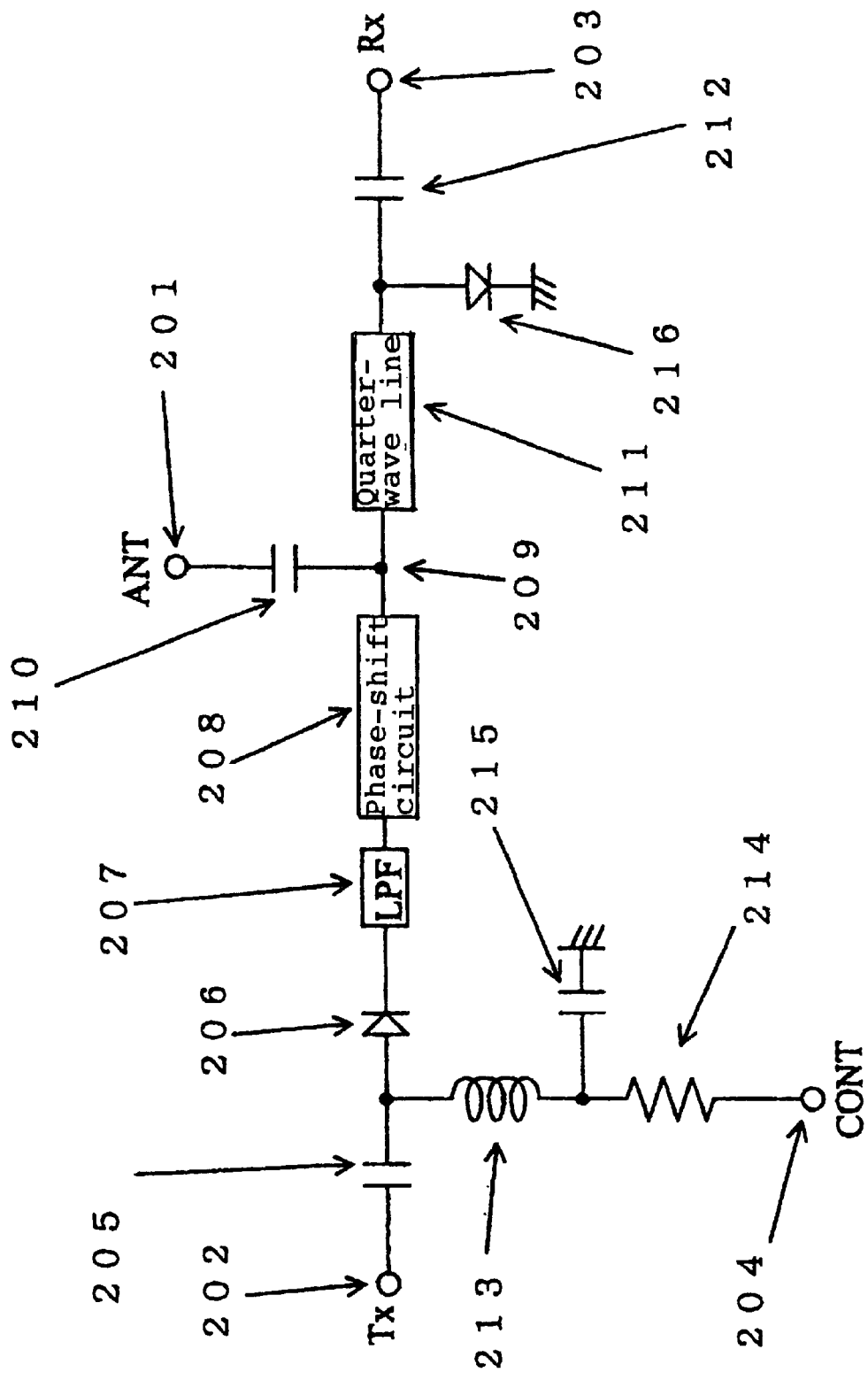
FIG. 2 is a block diagram of a second embodiment of the transmitting/receiving switch according to the present invention.

FIG. 2 shows a block diagram of a second embodiment of the transmitting/receiving switch according to the present invention.

The second embodiment of the transmitting/receiving switch according to the present invention comprises an antenna terminal 201 connected to an antenna ANT, a transmission terminal 202 connected to a transmission circuit Tx, a reception terminal 203 connected to a reception circuit Rx and a control terminal 204 connected to a control circuit CONT that performs alternate switching control.

The transmission terminal 202 is connected to the anode of a first diode 206 through a first capacitor 205 and the cathode of said first diode 206 is connected to the antenna terminal 201 through a low pass filter (LPF) 207 that passes. a transmission signal, a phase-shift circuit 208, a node 209 and a second capacitor 210.

The antenna terminal 201 is also connected to the reception terminal 203 through the second capacitor 210, the node 209, a quarter-wave line 211 and a third capacitor 212.

The anode of the first diode 206 is also connected to the control terminal 204 through a coil 213 and a resistance 214. Midpoint between the coil 213 and the resistance 214 is grounded through a fourth capacitor 215.

The anode of a second diode 216 is connected to a midpoint between the quarter-wave line 211 and the third capacitor 212, and the cathode of said second diode 216 is grounded.

Referring to the transmitting/receiving switch shown in FIG. 2, in case of connecting the transmission circuit Tx with the antenna ANT, a positive voltage is supplied from the control circuit CONT to the control terminal 204 that turns on the first and second diodes 206 and 216.

At this time, the direct-current component of the positive voltage supplied from the control terminal 204 is blocked by the first through fourth capacitors 205, 210, 212 and 215, and thus said positive voltage is supplied only on the partial circuit that includes the first and second diodes 206 and 216. Said positive voltage drives the first and second diodes 206 and 216 to the ON state.

The ON state of the first diode 206 lowers the impedance between the transmission terminal 202 and the antenna terminal 201 to establish a connection between them. Meanwhile, the ON state of the second diode 216 brings the quarter-wave line 211 grounded at high frequencies and makes the impedance from the node 209 toward the reception terminal 203 significantly high. Therefore, an input signal from the transmission terminal 202 is transmitted to the antenna terminal 201 through the first capacitor 205, the first diode 206, the low pass filter 207, the phase-shift circuit 208, the node 209 and the second capacitor 210 without leaking into the reception terminal 203.

In this case, the low pass filter 207 attenuates harmonic contents in the transmission signal produced by the distortion of the transmission-signal due to the non-linearity of the switching element of the first diode 206.

Also referring to the transmitting/receiving switch shown in FIG. 2, in case of connecting the reception circuit Rx with the antenna ANT, a null voltage is supplied from the control circuit CONT to the control terminal 204.

Under this condition, the first and second diodes 206 and 216 are driven to the OFF state and the impedance from the node 209 toward the transmission terminal 202 in the reception frequency band significantly increases by adjusting the phase using the phase-shift circuit 208 according to the amount of phase shift in the low pass filter 207. Therefore, a reception signal fed through the antenna terminal 201 is transmitted to the reception terminal 203 through the second capacitor 210, the node 209, the quarter-wave line 211 and the third capacitor 212 without leaking into the transmission terminal 202.

Figure 3:
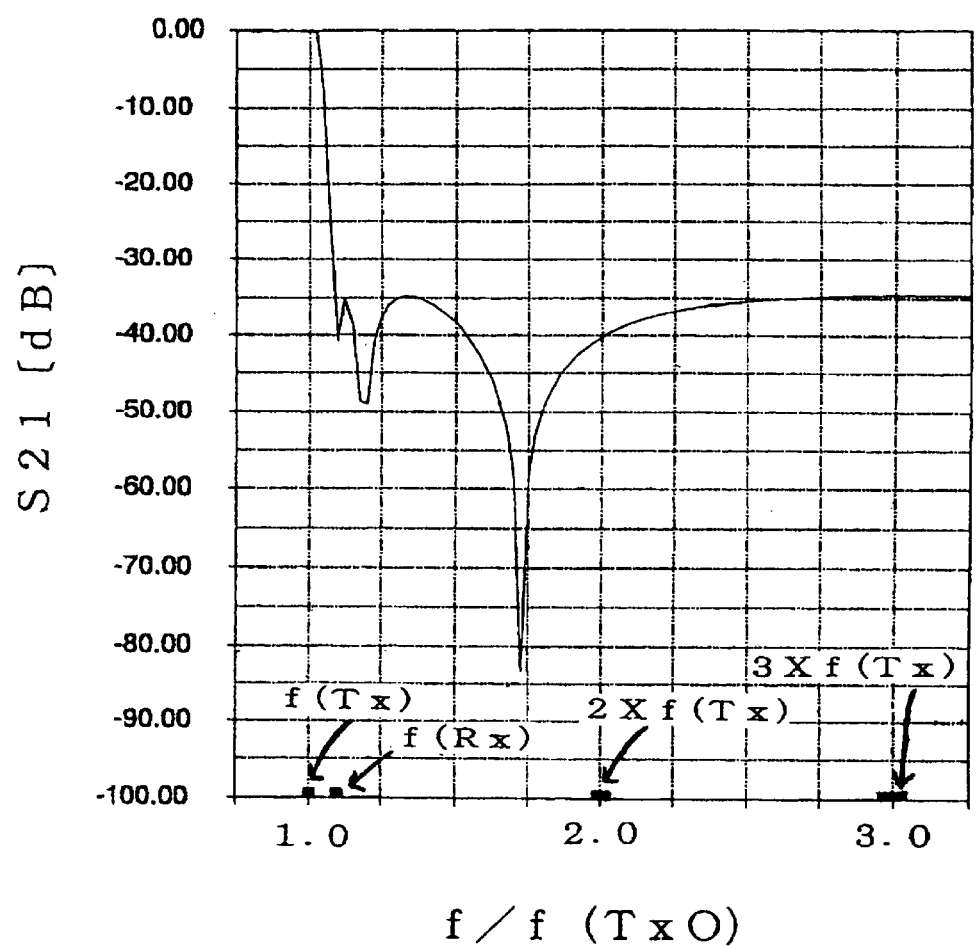
FIG. 3 is a graph of the passing characteristics of the second embodiment of the present invention at the time of transmission.

FIG. 3 shows a graph of the passing characteristics for transmission signals from the transmission terminal 202 to the antenna terminal 201 of the transmitting/receiving switch shown in FIG. 2.

In this graph, the vertical axis indicates an attenuation, 521 (dB), and the horizontal axis indicates a frequency normalized by the center frequency f(Tx0) of the transmission frequency band f(Tx), f/f(Tx0). In the transmission path from the transmission terminal 202 to the antenna terminal 201, harmonic contents 2xf(Tx) and 3xf(Tx) of the transmission frequency band f(Tx) are attenuated according to the characteristics of the low pass filter 207. In addition, the reception frequency band f(Rx) is also attenuated.

Figure 4:
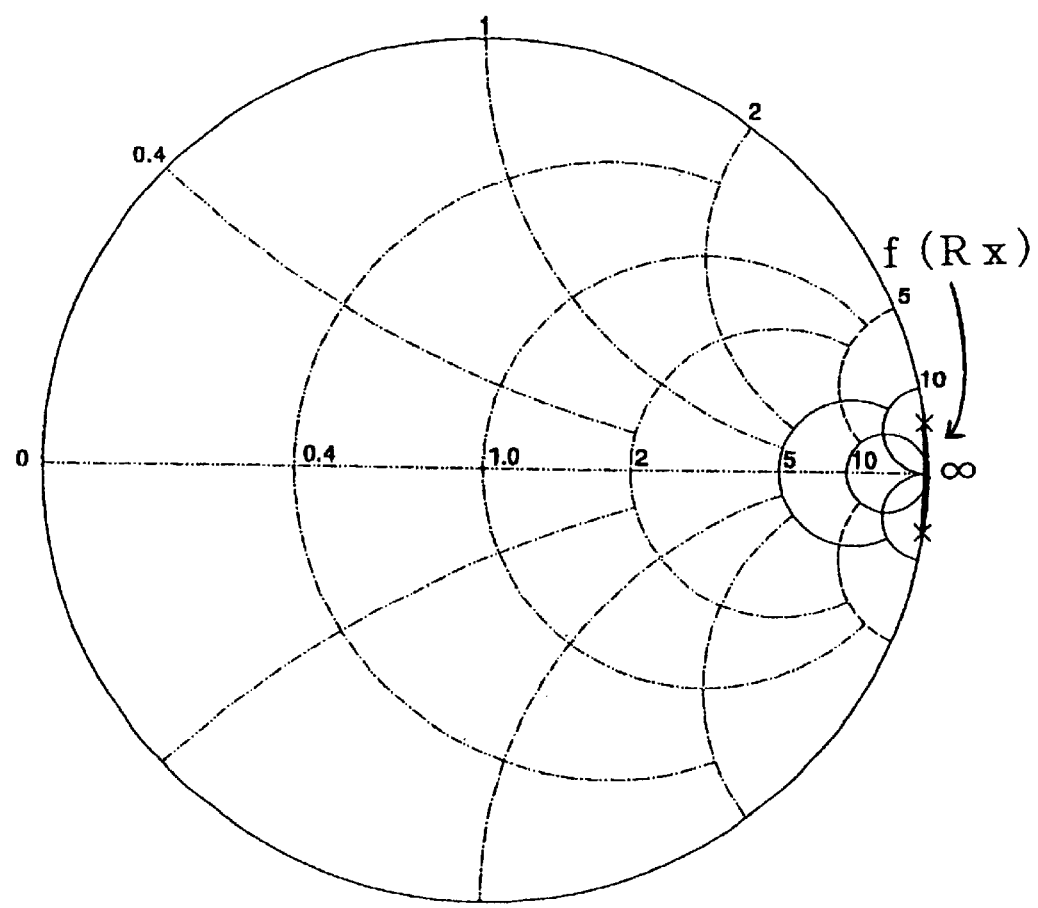
FIG. 4 is a graph of the impedance characteristics of the second embodiment of the present invention at the time of reception, indicating the impedance from the node toward the transmission terminal in the reception frequency band.
Figure 5:
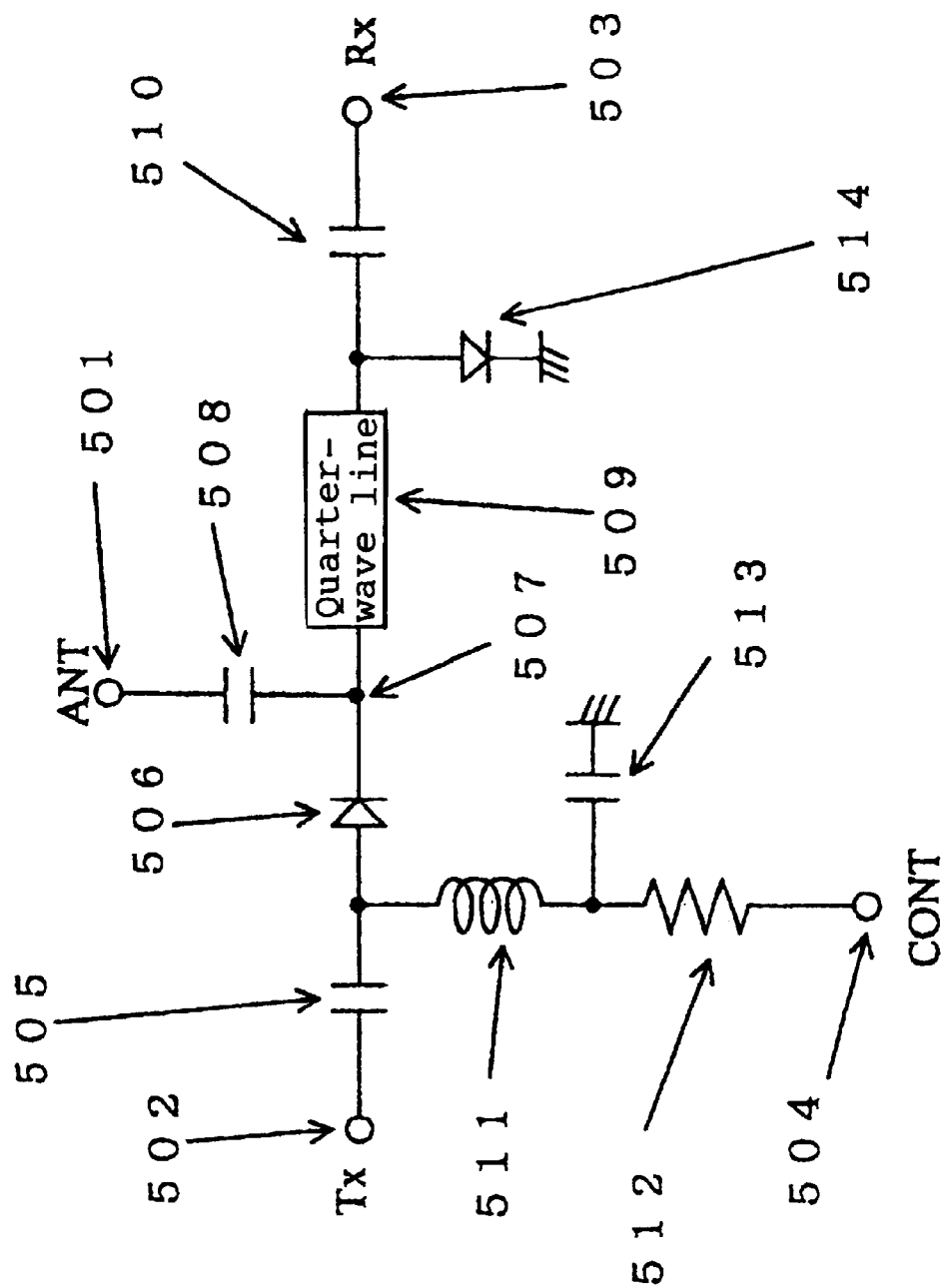
FIG. 5 is a block diagram of a conventional transmitting/receiving switch.

FIG. 4 shows a graph of the impedance characteristics in the reception frequency band from the node 209 toward the transmission terminal 202 of the transmitting/receiving switch shown in FIG. 2.

As indicated in this graph, the impedance in the reception frequency band from the node 209 toward the transmission terminal 202 significantly increases by adjusting the phase using the phase-shift circuit 208 according to the amount of phase shift in the low pass filter. 207.

Concerning the differences between the first and second embodiments, the first and second switching elements 104 and 108 in the first embodiment are replaced by the first and second diodes 206 and 216 in the second embodiment, and the filter 105 in the first embodiment is replaced by the low pass filter 207 in the second embodiment. Either configuration provides the same effect of the present invention.

The phase-shift circuit 106 or 208 can be either a distributed constant line such as a strip line or a circuit comprising lumped constant elements such as capacitor and/or coil.

By designing the filter 105 or 207 having phase characteristics that make the impedance from the node 107 or 209 toward the transmission terminal 102 or 202 in the reception frequency band significantly high, the same improved effect can be obtained without the phase-shift circuit 106 or 208.

Although, in the foregoing embodiments, the filter 105 and the low pass filter 207 are described to attenuate only harmonic contents of the transmission frequency, other spurious suppression can be realized with an appropriate configuration of the filter.

The transmitting/receiving switch of the present invention configured as described above attenuates harmonic contents in the transmission signal produced by the distortion of the transmission signal due to the non-linearity of the switching element, without any increase in the reception loss.

As described above, the transmitting/receiving switch according to the present invention comprises an antenna terminal connected to an antenna, a transmission terminal connected to a transmission circuit, a reception terminal connected to a reception circuit, first switching element that turns on or off the connection between the antenna terminal and transmission terminal, second switching element that turns on or off the connection between the antenna terminal and the reception terminal and filtering means inserted between the first switching element and the antenna terminal. The filtering means attenuates harmonic contents in the transmission signal and has the phase characteristics that make the impedance band from the node between the antenna terminal and the second switching element toward the transmission terminal high in the reception frequency band.

By way of example, with the filtering means configured by a filter and a phase-shift circuit: at the time of transmission, harmonic contents in the transmission signal produced by the distortion of the transmission signal due to the non-linearity of the switching element can be suppressed; at the time of reception, the impedance in the reception frequency band toward the transmission terminal can be made significantly high by adjusting the phase-shift circuit according to the amount of phase shift in the filter; and thus alternate switching between transmission and reception can be realized without any increase in the reception loss.

A portable terminal unit or the like that operates with a telecommunication satellite as a relay station requires a high signal power at the time of transmission. Any of the above described embodiments implemented in such a portable terminal unit brings about further improved telecommunication quality over the conventional techniques, because the transmitting/receiving switch of the present invention can attenuate harmonic contents in the transmission signal produced by the distortion of the transmission signal at the time of transmission due to the non-linearity of the switching element without any increase in the reception loss.

Preferable embodiment of such a portable terminal unit comprises an antenna for radio reception and radio transmission, any of the above described embodiments of the transmitting/receiving switch that alternately switches a signal transmission line for said radio reception or radio transmission, a transmission circuit connected to the transmission terminal of said transmitting/receiving switch and a reception circuit connected to the reception terminal of said transmitting/receiving switch.

As apparent from the above description, the present invention has an advantage as attenuate harmonic contents in the transmission signal produced by the distortion of the transmission signal at the time of transmission due to the non-linearity of the switching element without any increase in the reception loss.

What is claimed is:

1. A transmitting/receiving switch comprising:
   an antenna terminal connected to an antenna;
   a transmission terminal connected to a transmission circuit;
   a reception terminal connected to a reception circuit;
   a first switching element that turns on or off the connection between said antenna terminal and said transmission terminal;
   a second switching element coupled directly to the antenna terminal that turns on or off the connection between said antenna terminal and said reception terminal;
   a filter coupled between said first switching element and said antenna terminal; and
   a phase shift circuit coupled between the filter and the antenna terminal, wherein the phase shift circuit compensates for the phase shift of said filter.

2. The transmitting/receiving switch as set forth in claim 1, wherein said filtering means comprises:
   a filter that attenuates harmonic contents in said transmission signal, said harmonic contents resulting from said first switching element; and
   a phase shift circuit that performs phase adjustment on the basis of said phase characteristics according to the amount of phase shift caused by said filter.

3. The transmitting/receiving switch as set forth in claim 2, wherein said filter comprises a low pass filter that attenuates the harmonic content s in the transmission signal.

4. The transmitting/receiving switch as recited in claim 2, wherein said phase-shift circuit comprises either (1) a strip line or (2) a lumped constant circuit having a coil and/or capacitor.

5. The transmitting/receiving switch as set forth in claim 2, wherein said first switching element comprises a diode and said second switching element comprises a diode and a quarter-wave line.

6. The transmitting/receiving switch as set forth in claim 1, wherein said first switching element comprises a diode and said second switching element comprises a diode and a quarter-wave line.

7. A portable terminal unit comprising:
   an antenna for radio transmission and radio reception;
   a transmitting/receiving switch as recited in claim 1 that switches transmission lines through which signals flow during said radio transmission or radio reception;
   a transmission circuit connected to said transmission terminal of said transmitting/receiving switch; and
   a reception circuit connected to said reception terminal of said transmitting/receiving switch.

8. The transmitting/receiving switch as set forth in claim 1, wherein said filtering means is a filter having phase characteristics that provides the impedance at a significantly high value.

9. The transmitting/receiving switch set forth in claim 1, wherein the phase shift circuit has a phase shift of value that provides a phase of impedance toward the transmission terminal from the antenna terminal, which is substantially zero at the received frequency.

10. The transmitting/receiving switch as set forth in claim 1, wherein said first switching element comprises a diode and said second switching element comprises a diode and a quarter-wave line, for attenuating a frequency band of a reception signal and harmonics of a transmission signal.

11. The transmitting/receiving switch as set forth in claim 10, wherein the frequency band of the reception signal has a greater attenuation than an attenuation of the harmonics of the transmission signal.

* * * * *

UNITED STATES PATENT AND TRADEMARK OFFICE
CERTIFICATE OF CORRECTION

PATENT NO. : 7,127,215 B2 Page 1 of 1
APPLICATION NO. : 09/425668
DATED : October 24, 2006
INVENTOR(S) : Hiroyuki Nakamura et al.

It is certified that error appears in the above-identified patent and that said Letters Patent is hereby corrected as shown below:

<u>Cover Page, Item (54) Title</u>
Change "TRANSMITTING/RECEIVING SWITCH" to
-- A TRANSMITTING/RECEIVING SWITCH --

<u>Column 7</u>
Line 40, change "content s" to read -- contents --

Signed and Sealed this

Third Day of April, 2007

JON W. DUDAS
*Director of the United States Patent and Trademark Office*